(12) United States Patent
Horvitz

(10) Patent No.: US 8,254,393 B2
(45) Date of Patent: Aug. 28, 2012

(54) HARNESSING PREDICTIVE MODELS OF DURATIONS OF CHANNEL AVAILABILITY FOR ENHANCED OPPORTUNISTIC ALLOCATION OF RADIO SPECTRUM

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 11/771,349

(22) Filed: Jun. 29, 2007

(65) Prior Publication Data
US 2009/0003201 A1    Jan. 1, 2009

(51) Int. Cl.
*H04L 12/56* (2006.01)
(52) U.S. Cl. .................. 370/395.41; 370/348; 370/331; 705/80
(58) Field of Classification Search .............. 705/80; 370/348, 395.41
See application file for complete search history.

(56) References Cited

U.S. PATENT DOCUMENTS

| | | | |
|---|---|---|---|
| 5,343,240 A * | 8/1994 | Yu | 348/14.01 |
| 5,493,692 A | 2/1996 | Theimer et al. | |
| 5,544,321 A | 8/1996 | Theimer et al. | |
| 5,551,064 A | 8/1996 | Nobbe et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 5,943,622 A | 8/1999 | Yamashita | |
| 6,046,993 A * | 4/2000 | Åkerberg | 370/345 |
| 6,094,425 A * | 7/2000 | Auger et al. | 370/330 |
| 6,122,514 A * | 9/2000 | Spaur et al. | 455/448 |
| 6,466,232 B1 | 10/2002 | Newell et al. | |
| 6,466,793 B1 | 10/2002 | Wallstedt et al. | |
| 6,513,046 B1 | 1/2003 | Abbott, III et al. | |
| 6,522,628 B1 | 2/2003 | Patel et al. | |
| 6,549,915 B2 | 4/2003 | Abbott, III et al. | |
| 6,556,548 B1 * | 4/2003 | Kirkby et al. | 370/322 |

(Continued)

FOREIGN PATENT DOCUMENTS

WO    9800787    1/1998

(Continued)

OTHER PUBLICATIONS

International Search Report and Written Opinion dated Oct. 24, 2008 for PCT Application Serial No. PCT/US2008/066480, 10 Pages.

(Continued)

*Primary Examiner* — Kibrom T Hailu
*Assistant Examiner* — Zewdu A Beyen
(74) *Attorney, Agent, or Firm* — Lee & Hayes, PLLC

(57) ABSTRACT

A proactive adaptive radio methodology for the opportunistic allocation of radio spectrum is described. The methods can be used to allocate radio spectrum resources by employing machine learning to learn models, via accruing data over time, that have the ability to predict the context-sensitive durations of the availability of channels. The predictive models are combined with decision-theoretic cost-benefit analyses to minimize disruptions of service or quality that can be associated with reactive allocation policies. Rather than reacting to losses of channel, the proactive policies seek switches in advance of the loss of a channel. Beyond determining durations of availability for one or more frequency bands statistical machine learning also be employed to generate price predictions in order to facilitate a sale or rental of the available frequencies, and these predictions can be employed in the switching analyses The methods can be employed in non-cooperating distributed models of allocation, in centralized allocation approaches, and in hybrid spectrum allocation scenarios.

16 Claims, 11 Drawing Sheets

U.S. PATENT DOCUMENTS

| | | | |
|---|---|---|---|
| 6,728,544 | B1 | 4/2004 | Boyer et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,832,074 | B2 | 12/2004 | Borras-Chia et al. |
| 6,842,877 | B2 | 1/2005 | Robarts et al. |
| 6,928,053 | B1* | 8/2005 | Kadengal ............. 370/232 |
| 6,986,156 | B1 | 1/2006 | Rodriguez et al. |
| 6,999,771 | B1* | 2/2006 | Kasapi et al. .......... 455/450 |
| 7,031,720 | B2 | 4/2006 | Weerakoon et al. |
| 7,085,228 | B2 | 8/2006 | Zaki et al. |
| 7,409,423 | B2* | 8/2008 | Horvitz et al. ......... 709/206 |
| 7,616,960 | B2* | 11/2009 | Anke et al. ............ 455/450 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0080744 | A1* | 6/2002 | Ozluturk ............. 370/335 |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0114295 | A1* | 8/2002 | Takahiro et al. ........ 370/329 |
| 2003/0046401 | A1 | 3/2003 | Abbott et al. |
| 2003/0148765 | A1* | 8/2003 | Ma et al. ............. 455/438 |
| 2003/0154476 | A1 | 8/2003 | Abbott, III et al. |
| 2004/0143663 | A1 | 7/2004 | Leedom et al. |
| 2005/0034078 | A1 | 2/2005 | Abbott et al. |
| 2005/0078666 | A1* | 4/2005 | Beshai ............... 370/380 |
| 2005/0213503 | A1 | 9/2005 | Guo et al. |
| 2005/0289618 | A1* | 12/2005 | Hardin ............... 725/95 |
| 2006/0083205 | A1 | 4/2006 | Buddhikot et al. |
| 2006/0099955 | A1* | 5/2006 | Kasapi et al. .......... 455/450 |
| 2006/0198353 | A1* | 9/2006 | Wason et al. .......... 370/347 |
| 2006/0217067 | A1* | 9/2006 | Helbig ............... 455/63.1 |
| 2006/0286934 | A1 | 12/2006 | Kuffner et al. |
| 2007/0280110 | A1* | 12/2007 | Murphy et al. ......... 370/235 |
| 2008/0101460 | A1* | 5/2008 | Rodriguez ........... 375/240.01 |
| 2008/0109343 | A1* | 5/2008 | Robinson et al. ........ 705/37 |
| 2009/0201875 | A1* | 8/2009 | Hasegawa et al. ....... 370/329 |

FOREIGN PATENT DOCUMENTS

| | | |
|---|---|---|
| WO | 2006027557 A1 | 3/2006 |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In the 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Enger. "Dynamic Enhanced Radio Resource Allocation for Wireless Communication Networks" (1998) IEEE, pp. 1700-1704.

Nissen, et al. "A Technology Enabled Framework for Dynamic Allocation of the Radio Frequency Spectrum" (2004) The MITRE Corporation, 10 pages.

Grandblaise, et al. "Dynamic Spectrum Allocation (DSA) and Reconfigurability" (2002) SDR Forum, 6 pages.

Salgado, et al. "Spectrum Sharing Through Dynamic Channel Assignment for Open Access to Personal Communications Services" (1995) Proceedings of the IEEE International Conference, pp. 417-422.

\* cited by examiner

HARNESSING PREDICTIVE MODELS OF DURATIONS OF CHANNEL AVAILABILITY FOR ENHANCED OPPORTUNISTIC ALLOCATION OF RADIO SPECTRUM

BACKGROUND OF THE INVENTION

Wireless communications is one of the fastest growing industries. As with any industry faced with a large demand for products, wireless service providers are pressed not only to expand range of products but also to be more cost efficient. Unfortunately, the product to sell, which is, information transmission from one or more points to one or more other points, is limited by technology and regulations. Ubiquitous presence of wireless devices has stressed existing resources such as the fixed radio spectrum that is shared between typically all communication systems. Generally, the maximum range for wireless communications, is largely determined by amount of power that can be transmitted (and therefore received), and capacity is largely determined by amount of spectrum available. A fixed radio spectrum or bandwidth is statically allocated to the service providers by the Federal Communications Commission (FCC) and accordingly radio networks are statically designed based on traffic throughput.

A communication network such as a cellular telephone system is generally designed such that each cellular call is assigned a pair of frequencies, typically called an RF (radio frequency) channel, for duration of the call. The RF channel remains dedicated until termination of the conversation which is an expensive use of precious RF channel resources. Additionally, radio channels may be over allocated to certain sectors resulting in non-optimal use of available spectrum or spectrum holes where there may be no devices within an area, thereby consuming more bandwidth than necessary besides creating intra-network interference. Such wastage is not desirable in an environment where resources such as, available spectrum, are limited. Hence, service providers need to explore more efficient ways of using these limited resources.

In order to better utilize this resource, a wireless service provider generally divides a serviced area geographically into a number of cells and within these cells a single RF channel may be utilized by multiple consumers without interference if they are spaced apart beyond a certain distance. One methodology of assigning channels to cells is a fixed channel assignment (FCA) method wherein certain channels are permanently assigned to specific cells so that a given channel is assigned to two cells simultaneously only if they are spatially separated by the minimum distance. However, dynamic channel assignment (DCA) within cells wherein existing spectrum may be shared improves efficiency and results in better utilization of the limited resources.

More broadly there have been efforts referred to as "cognitive radio" that explore the feasibility of moving beyond tight assignments of ownership of spectrum and instead allow multiple players to make opportunistic usage of radio spectrum if the spectrum comes available in real-time.

More constrained notions allow a primary owner to cede secondary users usage of spectrum if communications activities by the secondary users do not interfere with the primary owner's applications. For example, a television operator may not have interest in using bandwidth within its allocated spectrum within a particular region, based on peripheral location of the region, and allow a secondary user to make use of that spectrum in that region should their be evidence that no disruptions will occur to television clients in that region (e.g., there are no people with televisions using the broadcast spectrum in that region).

In some applications, a primary user of bandwidth always has precedence but a secondary user can assume that the spectrum is available and use spectrum opportunistically should tests of usage (e.g., via listening to usage) e.g., monitoring two-way usage of the channel reveal that the channel is available to the secondary user.

In another variant a secondary user always has access to some expensive channel, but attempts to opportunistically gain access to a less expensive channel as it becomes available. In another scenario, a user has access to a channel with some set of properties such as bandwidth, but can opportunistically gain access to higher bandwidth channel that can be used to send higher fidelity transmissions.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

An adaptive radio system in accordance with embodiments described herein provides for sensing channels available for use within a communication system and selling such channels for the duration of their availability thereby optimizing the use of a radio transceiver as well as the available spectrum. A bandwidth sensing component within the radio system continually monitors a plurality of communication channels or radio frequencies employed in the communication system and senses when one or more communication channels are not currently in use and are therefore available for sharing with others. Additionally, it employs machine learning to determine the probability distributions over the duration of availability of the one or more channels given observational evidence, such as last usage, variables capturing statistics of usage over time, such as mean inter-availability intervals, bursts of usage, time of year, time of day, day of week, and so on. A bandwidth allocation component within the adaptive radio system makes decisions about the best channels to use based on the properties of the channels and their expected durations of availabilities, given the history of usage for such channels. The probabilistic predictions can be ongoing with allocation, and be used to predict an upcoming loss of a channel and allow for switching to another channel to occur in a proactive versus a reactive manner. In more general applications and pricing models, a bandwidth allocation component could also generate probability distributions over the prices for using one or more available communication channels based on forecasts on demand.

In accordance with other embodiments, the system may also be employed to make predictions about the bandwidth market. The bandwidth market is initially analyzed to determine one or more channels that are in demand. The bandwidth sensing component is employed to sense availability of these channels and infer the duration of their availability. If it is sensed that one or more such channels are available then the bandwidth allocation component generates a lower price for the channels thereby predicting a fall in the bandwidth market. On the contrary, if there is a paucity of such channels for communication, the bandwidth allocation component sets higher prices for these channels thereby predicting a rise in prices.

Multiple variants of policies and associated ecosystems for the dynamic allocation of radio spectrum are feasible, some based on distributed or decentralized decision making policies, and others relying on the use of some coordinative system or service that assists with requests and allocations. However, all involve policies and methods for decision making about access and a number of such approaches are associated with methods for ongoing testing, bumping of users off channels, and reallocations as they become used by communicators with higher priority. Unfortunately, multiple schemes lead to delays and related transmission switching glitches because of the loss of bandwidth when a primary user or another user grabs bandwidth during communications, forcing the current user to find another channel, such as downmoding to a default channel. We describe systems and methods for minimizing glitches based on reactive switching via the use of statistical machine learning to build predictive models that are used continuously to predict the availability and loss of availability of spectrum to a user or set of users based on observation of evidence about context of a situation. The predictive methods can be harnessed to minimize disruptions associated with reactive methods and also to better optimize overall the allocation of radio spectrum to multiple participants.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DESCRIPTION OF THE INVENTION

Figure 1:
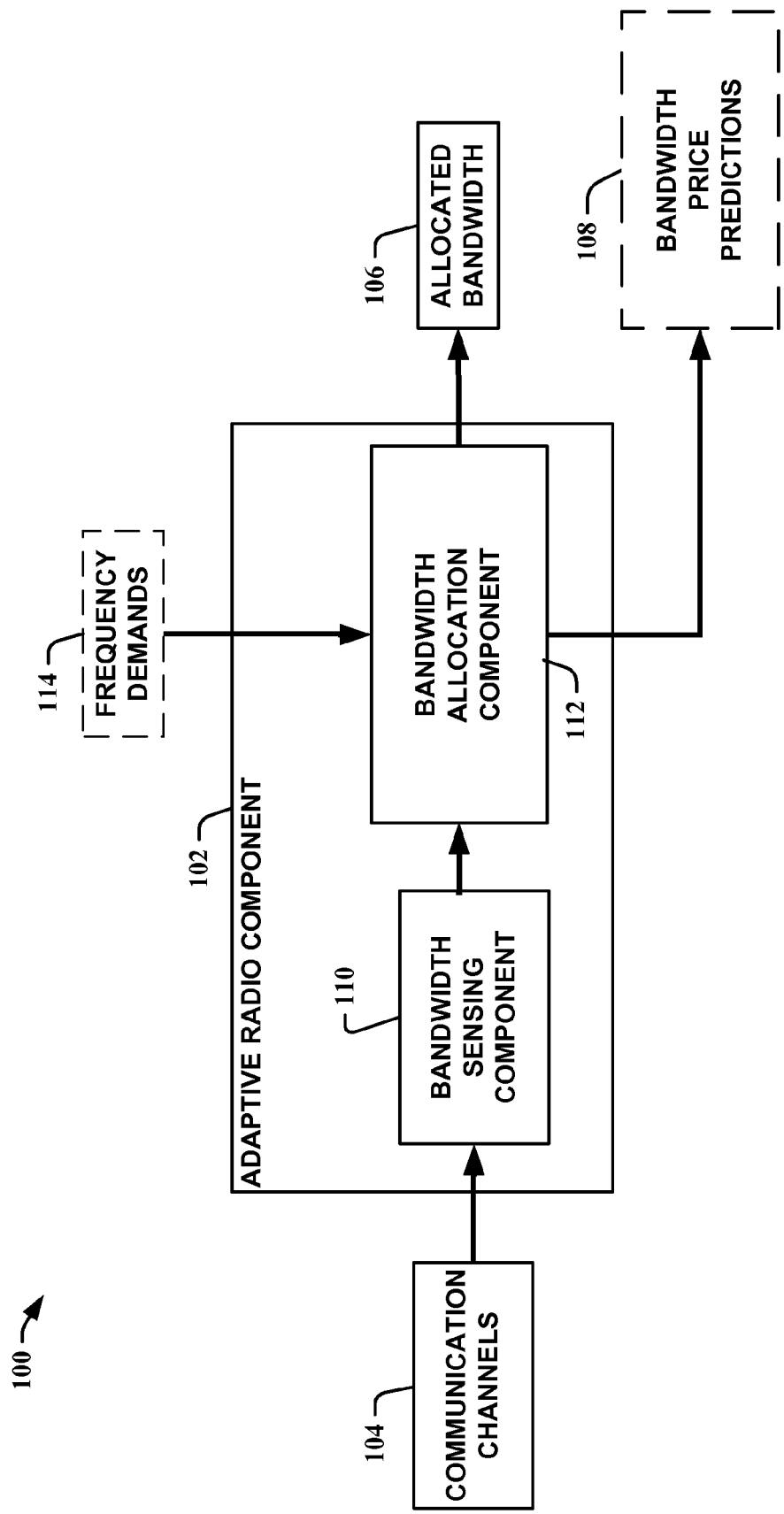
FIG. 1 is a block diagram that illustrates a computer implemented adaptive radio system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", "schema", "algorithm" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The recent past has seen rapid strides in the development of communication systems which has led to an expanding array of technologies that are able to exploit new areas of radio frequency spectrum. This in turn has increased the demand for the radio spectrum. The radio spectrum is statically allocated to various service providers such as cellular telephone companies, cable and satellite television operators etc. by the FCC, a regulatory body that auctions spectrum licenses as different parts of the spectrum are made available for commercial use. These licenses are very expensive and moreover as radio spectrum is a fixed commodity, optimizing its usage will result in cost-efficient systems that make services more affordable to consumers. The systems and methods described herein facilitate trading of the spectrum between various service providers for example, thereby optimizing the use of communication equipment as well the communication channels.

FIG. 1 depicts an adaptive radio system 100 in accordance with various embodiments and features described herein. The system 100 provides for monitoring various communication channels 104 that are employed by a communication system (not shown) for example, a television system, a wireless radio system, a cellular telephone system etc. By way of illustration and not limitation, the channels 104 can include frequency bands currently ranging for example from 9 kHz to 275 GHz which have been licensed for use by one or more terrestrial or space radio communication services by the FCC. An adaptive radio component 102 within the system 100 further comprises a bandwidth sensing component 110 that can analyze the communication channels 104 in order to sense one or more free channels that are not currently employed in providing communications or can accommodate more users without inconveniencing primary users and can therefore be shared. Additionally, the bandwidth sensing component 110 also infers a time until which the one or more channels will be available for usage. These inferences can be derived from the probability distributions over the duration of availability of the one or more channels given observational evidence, such as last usage, variables capturing statistics of usage over time, such as mean inter-availability intervals, bursts of usage, time of year, time of day, day of week, and so on. Hence, such available channels are dynamically provided to other service agents for the duration of their availability. This method of dynamic channel assignment typically strives to optimize the problem of frequency or channel reuse while maintaining sufficient geographic distance between wireless systems that transmit on the same channel.

The adaptive radio component 102 also comprises a bandwidth allocation component 112 that interacts with the bandwidth sensing component 110 to determine allocation of available frequencies based on demand 114. The demand for bandwidth may fluctuate depending on space and time factors. For example, within a mobile communication system certain geographic regions or cells generate a constant demand for bandwidth. In other regions such demand may vary according to network traffic at busy hour versus off-peak hours. In general, various mathematical models are employed to allocate a minimum number of channels to satisfy given demand without causing network interference thereby utilizing the available spectrum most efficiently. However, due to existing regulations, service providers may reassign channels dynamically within their own licensed spectrum. Deregulating the usage of spectrum to permit short-term rental/lease of the RF spectrum between various parties, similar to the rental of radio equipment, is one means to overcome this limitation faced by the service providers. In accordance with an aspect of the bandwidth allocation system, if the bandwidth sensing component 110 detects that a particular channel is free for a certain time interval or has the capacity to service more users, the provider may employ the bandwidth allocation component 112 to sell/rent the free channel to another customer based on existing channel demand 114. The customers may be another service provider or individual customers with their own radio equipment but who need the channel to use with the equipment. In addition to allocating bandwidth 106, the bandwidth allocation component 112 also generates price predictions 108 to facilitate selling the channel to other providers/customers for the duration of its availability. Therefore, dynamic channel allocation facilitated by wider tuning ranges of RF transceivers, and deregulation of the spectrum will turn the RF spectrum into a commodity that may be employed to generate additional revenue rather than just an asset utilized to service customers. Thus, the adaptive radio component 102 can be employed by a service provider to optimize the usage of valuable resources such as radio equipment and the RF spectrum.

Figure 2:
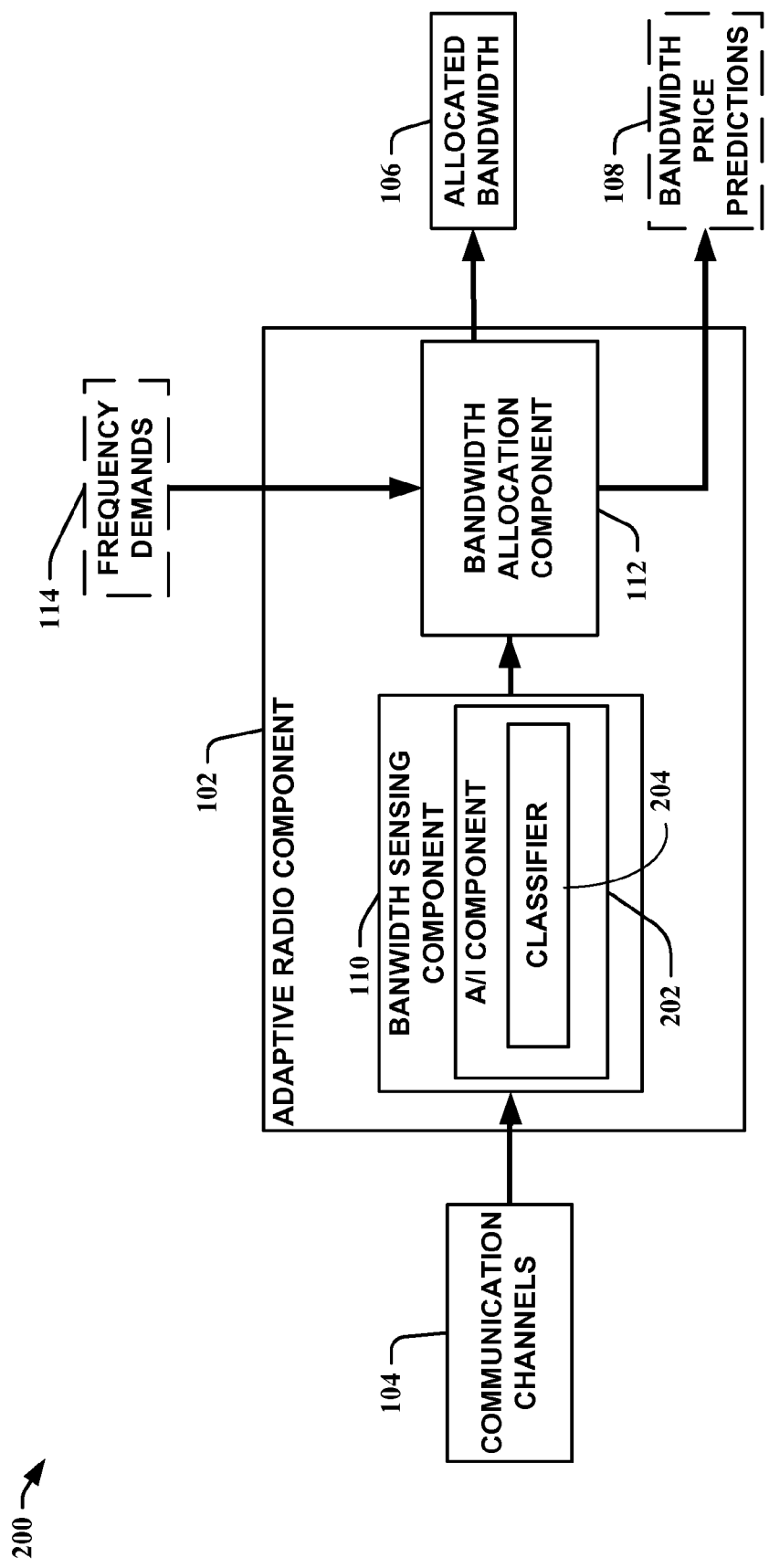
FIG. 2 is a block diagram that illustrates an embodiment of the computer implemented adaptive radio system that employs a machine learning and reasoning component to build and update models from historical data, to yield classifiers that can be used to sense the availability and duration of channels from contextual information.

FIG. 2 is a block diagram that illustrates an embodiment of the computer implemented bandwidth allocation system that employs machine learning and automatic decision making to infer which frequencies are available and for how long. These predictions can be used to avoid glitches due to reactive switches or delays when channels that have been used opportunistically become unavailable. For sake of brevity, components common to the embodiment of FIG. 1 will not be further discussed. Likewise, discussion regarding components repeated in connection with other embodiments may not be repeated for ease of readability.

The bandwidth sensing component 110 comprises a machine learning and reasoning component, referred to as the artificial intelligence (AI) component 202. The AI component 202 can employ statistical machine learning, for example, in connection with making one-shot or continuing determinations or inferences regarding the duration of channel availability. In one aspect, the artificial intelligence (A/I) component 202 comprises a statistical classifier 204. The classifier 204 is employed to determine which of the communication channels are available and the duration of their availability. The inferences can be based in part upon explicit training of classifier(s) before employing the system 200, or implicit training based at least upon inferences made using the system 200. Explicit training of a classifier can require a user and/or programmer to input data wherein the availability and duration of the channels were correctly inferred. For example for a cellular communication system, the channel availability for a given cell can be based on certain parameters such as call demand within the cell, co-channel interference etc. The classifier can also be implicitly trained by monitoring inferred channel availability. Thus, as availability of channels is sensed and their duration of availability is predicted, the classifier 204 is continuously trained based on such inferences. For example, the classifier 204 when employed in a cellular communication system predicts the duration of channel availability by predicting the time until an arrival of a new call or a call handed off from another cell would occupy the sensed free channel.

Figure 3:
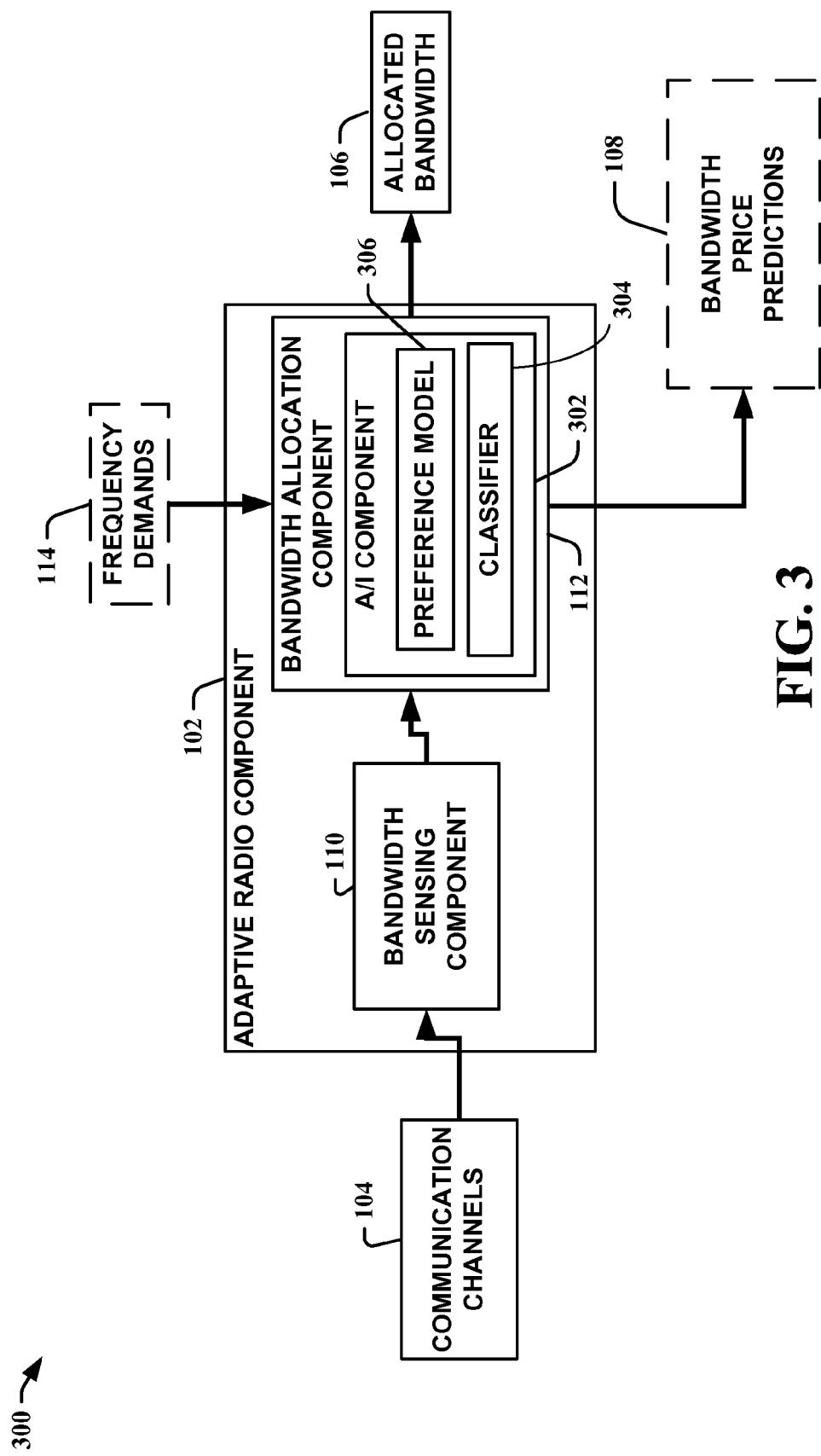
FIG. 3 is a block diagram that illustrates another embodiment of the adaptive radio system that employs an artificial intelligence component to allocate channels and generate price predictions.

The AI component 202 can employ one of several machine learning and reasoning schemes (e.g., neural networks, expert systems, Bayesian belief networks, support vector machines (SVMs), Hidden Markov Models (HMMs), fuzzy logic, data fusion, etc.) in accordance with implementing various automated aspects described herein. The AI component 202 can factor historical data, extrinsic data, etc. and can compute cost of making an incorrect determination or inference versus benefit of making a correct determination or inference. Accordingly, a utility-based analysis can be employed with providing such information to other components or taking automated action. Ranking and confidence measures can be calculated and employed in connection with such analysis One of the fundamental principles of a free market economy is that resources (e.g., products, services, money . . . ) will tend to be redistributed by voluntary transactions in a manner that maximizes wealth and/or utility to all parties involved in the transactions. As such there is a natural tendency for competition between both buyers and sellers to efficiently allocate the resources and create markets that can be measured and analyzed in terms of money. Accordingly, FIG. 3 is a block diagram that illustrates another embodiment of a bandwidth allocation system 300 that employs a machine learning and reasoning component 302 within a bandwidth allocation component 112 in order to allocate channels 106 based on frequency demands 114 in addition to generating price predictions 108 for the allocated bandwidth.

The demand and hence the price of free channels varies in accordance with numerous factors to be considered based on various communication systems. For example within a cellular telephone system, the particular cells or geographic regions where the channels are available is one such factor. A free channel in a cell located in an urban area might fetch higher price/rent as compared to its availability in rural cell. The price variation based on geographic location is not only be due to variation in demand but can also be due to geographic topology since RF reception differs within different environments especially with the presence of signal obstructers like walls, metal roofs etc. Similarly, the price may vary depending on particular frequencies available since certain frequencies penetrate better than others. The time of availability such as peak/off-peak hour, weekdays or weekends, as well as duration of availability are some of the other factors that may affect the price/rent of the available channels. A channel which is available for longer duration may be less expensive as compared to a channel which due to greater demand may be available for shorter duration.

Additionally, as stated supra, the channel availability information generated by the bandwidth sensing component 110 can be utilized for mitigating inconveniences associated with reactive switches. Accordingly, AI component 302 within the bandwidth allocation component 112 comprises a model of preference 306 that is used in guiding decisions, e.g., making the trade between maximizing the duration of the use of a channel and the rising probability of being forced into a reactive switch versus making a proactive switch in advance based on the reaching of threshold in the amount of time left before a switch may be imposed. The preference model 306 can use decision theoretic planning in order to aid in the decision of staying with a current channel or to switch channels. Decision theory employs probability distribution over various outcomes of an action in any state, preference functions over outcomes and utility functions to select a plan that has maximum utility. Accordingly, the adaptive radio component 102 can aid in making the decision to switch, channel to switch to in addition to deciding the time of switch. For example, various factors such as expected cost of switching based on the bandwidth price predictions and the time, duration of channel availability can facilitate in making a decision on switching immediately to a selected channel, staying with the current channel or making a switch to the selected channel at a later time. For example, the switch to the selected channel can be made at a selected time interval after the threshold time or even when a reactive switch is imposed. In the last case, since an alternative channel for communication is selected prior to imposition of the switch, it would still mitigate the inconveniences associated with the imposed reactive switch. The cost/benefit analysis provided by the system 100 can not only be adopted by a user to make a proactive switch but it can also be used by an authority controlling the spectrum to impose a switch on a user. The authority can mitigate the effects of the imposed switch by providing a pre-selected alternate communication channel to the user at the time of making the switch.

The AI component 302 can employ a statistical machine learning approach, for example, in connection with making determinations or inferences regarding channel allocations 106 and bandwidth price predictions 108. The artificial intelligence (A/I) component 302 can comprise a statistical classifier 304. The classifier 304 can be employed to determine which of the communication channels should be allocated to a customer as well as the price of the channel. The inferences can be based in part upon explicit training of classifier(s) before employing the system 300, or implicit training based at least upon previous inferences made using the system 300. Explicit training of a classifier can require a user and/or programmer to input data wherein the frequency allocations and price predictions were correctly inferred for a given customer in a particular cell based on various factors listed supra. The classifier may be implicitly trained by monitoring correctly inferred channel allocations and price predictions. Thus, as channels are allocated and their prices are fixed, the classifier 304 is continuously trained based on such inferences.

The AI component 302 can employ any suitable scheme (e.g., neural networks, expert systems, Bayesian belief networks, support vector machines (SVMs), Hidden Markov Models (HMMs), fuzzy logic, data fusion, etc.) in accordance with implementing various automated aspects described herein. The AI component 302 can factor historical data, extrinsic data, etc. and can compute cost of making an incorrect determination or inference versus benefit of making a correct determination or inference.

Expected utility analyses known as value of information computations may be employed to guide the sensing and data collection so as to maximize the effectiveness of the models of spectrum availability.

An expected utility-based analysis can be employed with providing such predictive information to other components or taking automated action. Ranking and confidence measures can be calculated and employed in connection with such analysis.

Although the bandwidth sensing component 110 and the bandwidth allocation component 112 have been depicted as two separate components, it should be appreciated that the functionality describe supra, may be carried out by more or less number of components.

A methodology in accordance with features presented herein will now be described via a series of acts. It is to be appreciated that the methodologies claimed herein are not limited by the order of acts, as some acts may occur in different orders, or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as claimed herein.

Figure 4:
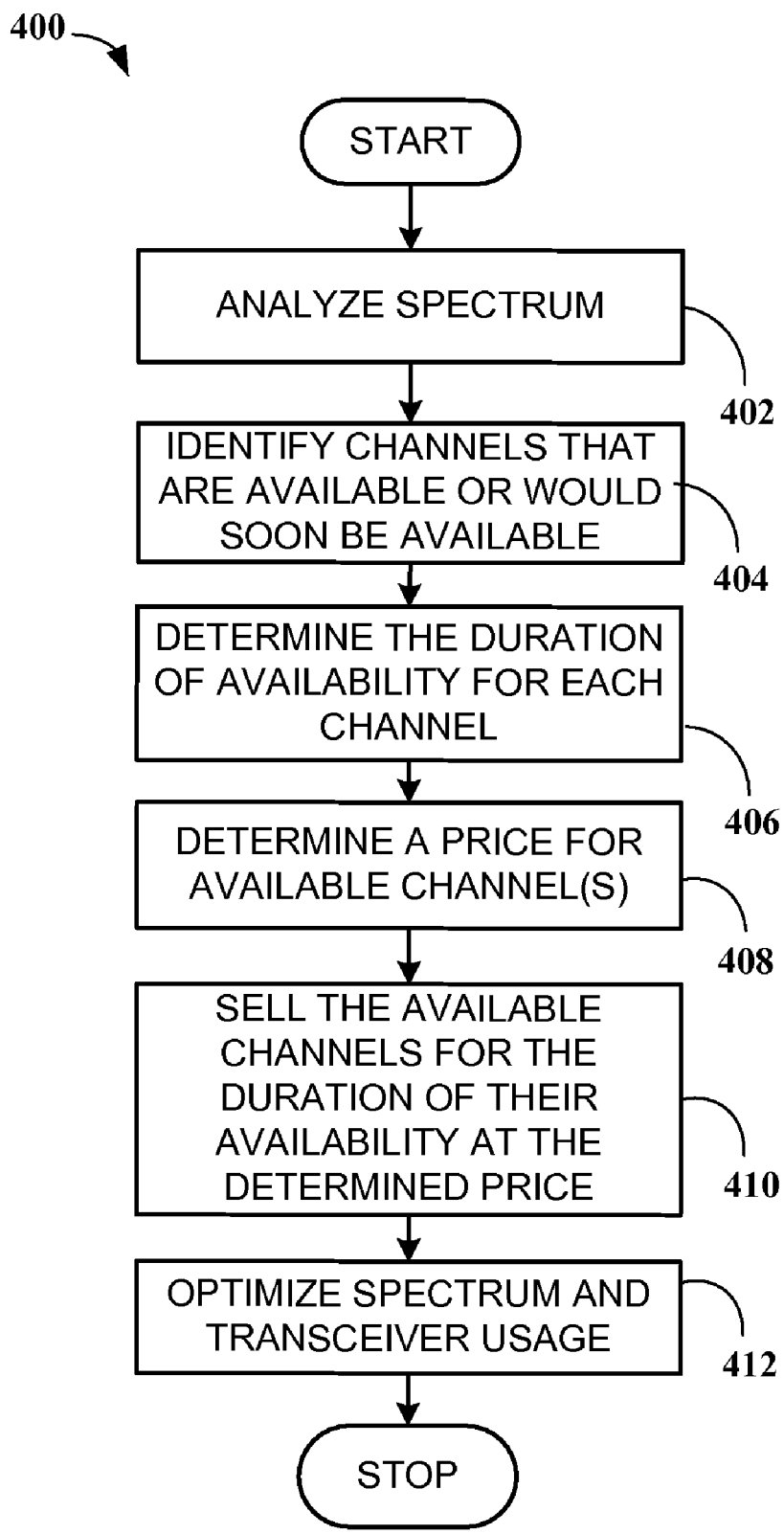
FIG. 4 is a flow diagram that illustrates an embodiment of a methodology to sell/rent/lease communication channels implemented in accordance with a bandwidth allocation system.

FIG. 4 illustrates one particular methodology 400 to sell/rent/lease communication channel(s) implemented in accordance with a bandwidth allocation system. A limited portion of the electromagnetic spectrum is divided into numerous channels to facilitate communications for a plurality of consumers and within a cellular telephone system may encompass Code Division Multiple Access (CDMA) and/or Frequency Division Multiple Access (FDMA) and/or Time Division Multiple Access (TDMA) communications or their combinations. At 402, the available spectrum is analyzed by various techniques such as employment of a spectrum analyzer or supported receiver. At 404 any channel(s) that are currently available and not employed in facilitating communications are identified. Machine learning used in conjunction with policies that undertake automatic decision making based on the output of predictive models can also predict which if any of the channels would soon be available, and for how long, and when channels that are being used in an opportunistic manner may be lost to other users, such as the usage by a primary owner of the bandwidth in some schemes. At 406 the duration of availability of these channel(s) that are currently available or would soon be free is predicted. This can be obtained based upon, for example, the relationship between a cell's expected traffic level and the number of channels needed by the system to service such traffic. At 408 a price for selling/renting the channels for their duration of availability is determined. This is discussed in further detail with respect to FIG. 5. At 410 one or more of the identified channel(s) are sold or leased for its duration of availability customers who may lease the channel with the transceiver or just the channel based on their requirements. Thus, at 412 use of the equipment such as the radio transceiver as well as the spectrum is optimized by selling/renting it out by an owner/licensee.

Figure 5:
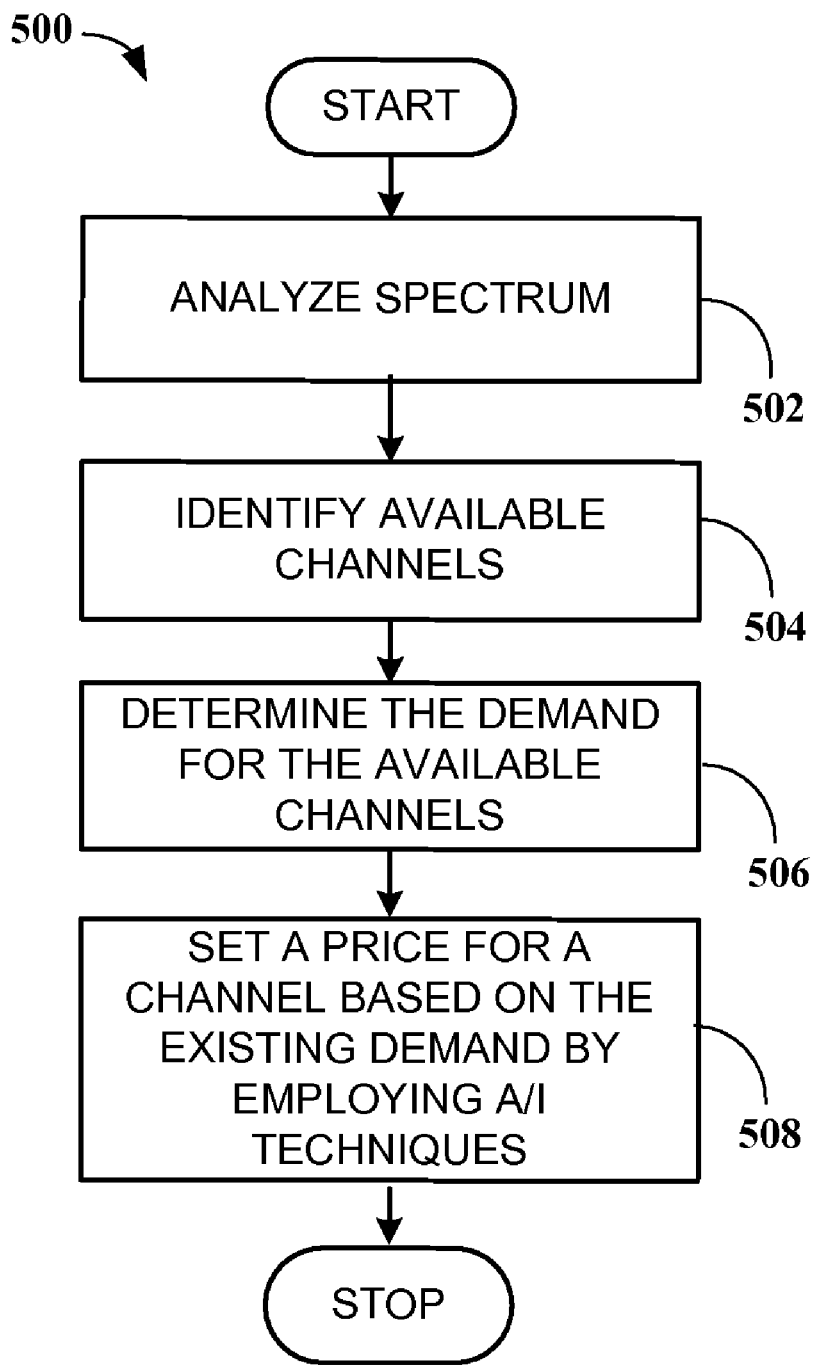
FIG. 5 is a flow diagram that illustrates another embodiment of a methodology to sell communication channels implemented in accordance with a bandwidth allocation system.

Turning now to FIG. 5, a flow diagram illustrates a methodology that facilitates setting a price in order to sell/rent communication channels. At 502, the available spectrum is analyzed using various techniques as discussed supra. At 504, one or more channels that are currently available or may be shortly available for renting/selling are identified. At 506, the demand for the one or more available channels is determined based upon for example, estimated traffic within respective cells in a mobile communication system and the channels required to handle the traffic. At 508, a price is set for selling/renting the available channels based on primarily on the demand. As discussed supra, the price may vary with other factors such as the particular channel or frequency band that is available, the geographic location of its availability etc. AI techniques based on probabilistic or statistical based approach can be employed in connection with making the inferences or determinations. An explicitly or implicitly trained classifier can be used to make predictions for bandwidth prices based at least on the existing demand.

Figure 6:
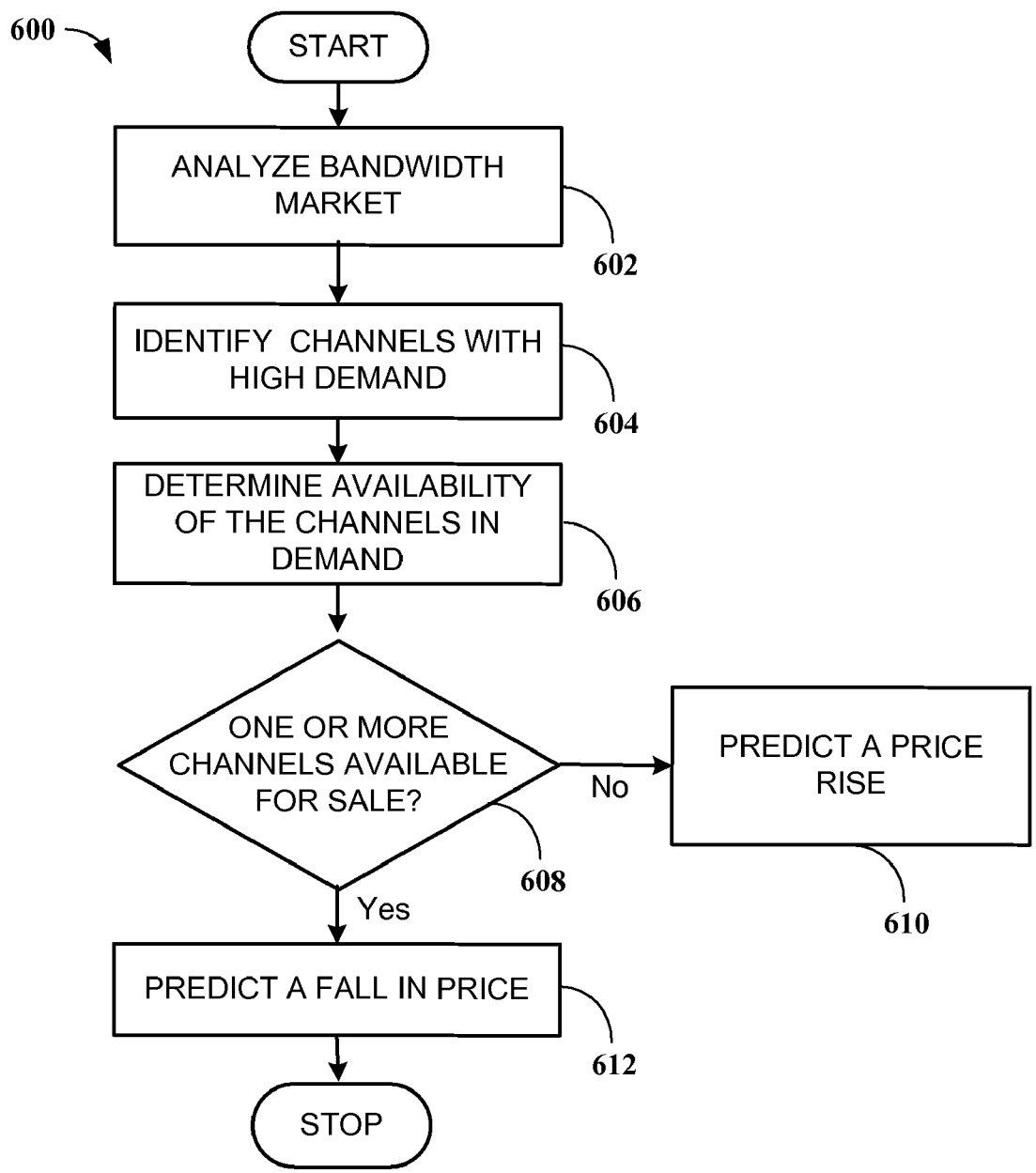
FIG. 6 is a flow diagram that illustrates an embodiment of a methodology to predict trends in the bandwidth market.

FIG. 6 is a flow chart of a methodology that utilizes aspects of adaptive radio system to make predictions about the bandwidth market. As the price paid for a particular resource in a voluntary transaction is representative of the value of that resource to each party, monetary transactions provide a common measuring stick for comparing the relative values attached to particular resources. Accordingly, the price/rent obtained for free channels in these transactions may be utilized to make predictions for price fluctuations. At 602, the bandwidth market is studied and analyzed through various tools for example, online tools provided by financial institutions with presence in telecom markets. Upon the analysis at 604, the frequency bands with the highest demand are identified. At 606, a system such as the adaptable radio component disclosed herein can be employed to sense the availability and obtain the duration of availability of the channels with high demand. At 608, a determination is made if one or more of the channels in high demand are available for sale/rent within a predetermined time interval. If no channels are available for sale within the predetermined time, then a rise in prices of these channels is predicted at 610. If one or more channels are available then a fall in prices of the bandwidth market is predicted as shown at 612. Thus, an adaptive radio system described herein optimizes the use of the transceiver such that the bandwidth is sold according to demand thereby lending an ability to predict when the price will rise and fall. This allows a unique foresight into the bandwidth market.

Figure 7A:
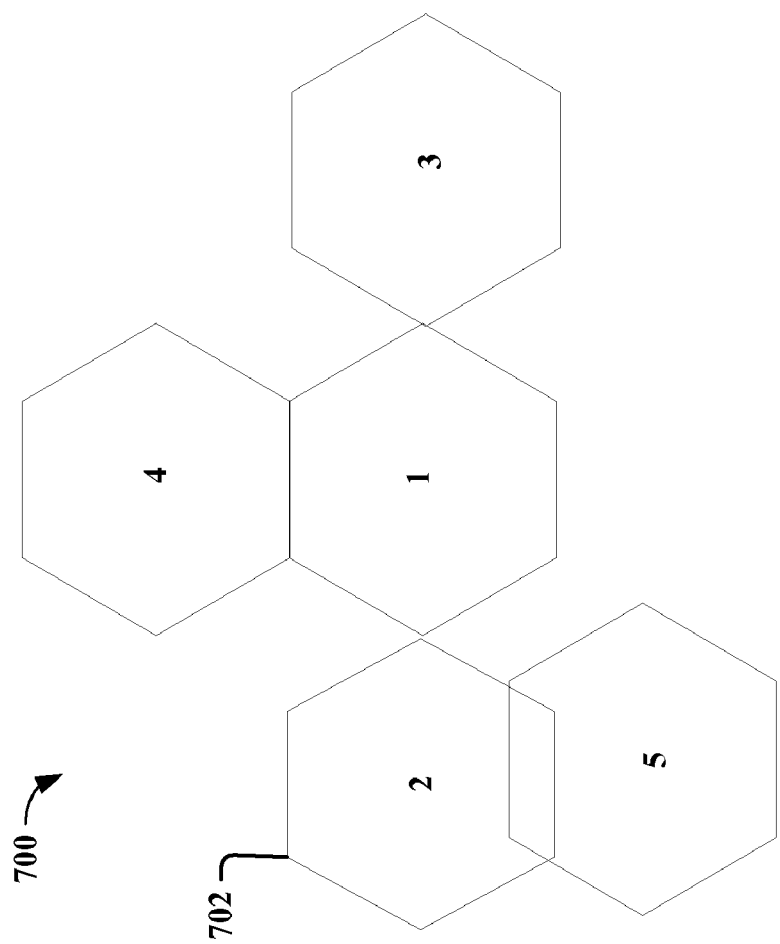
FIG. 7*a* illustrates a block diagram of a communication system that can employ the adaptive radio system in order to optimize the usage of its resources.

In FIG. 7a, an example of a communication system 700 that can utilize an adaptive radio system in accordance with various aspects described herein is presented. The figure depicts a geographic cell map of a cellular telecommunication system. Each hexagon 702 represents a cell which has a radio transmission tower to receive/transmit radio signals. Additionally, each of the cells from 1 through 5 is assigned certain number of channels by a provider in order to handle the cellular network traffic. However, due to fluctuations in network traffic one or more channels within the cells may not be involved in providing communication for certain duration of time and hence are free for sale or lease. If the channel cannot be assigned to other cells due to co-channel interference then it would be advantageous to the provider to sell the channel for the duration of its availability to a customer, for example, other service providers, thereby generating extra revenue along with optimizing the usage of resources such as a radio transceiver and the spectrum.

Figure 7B:
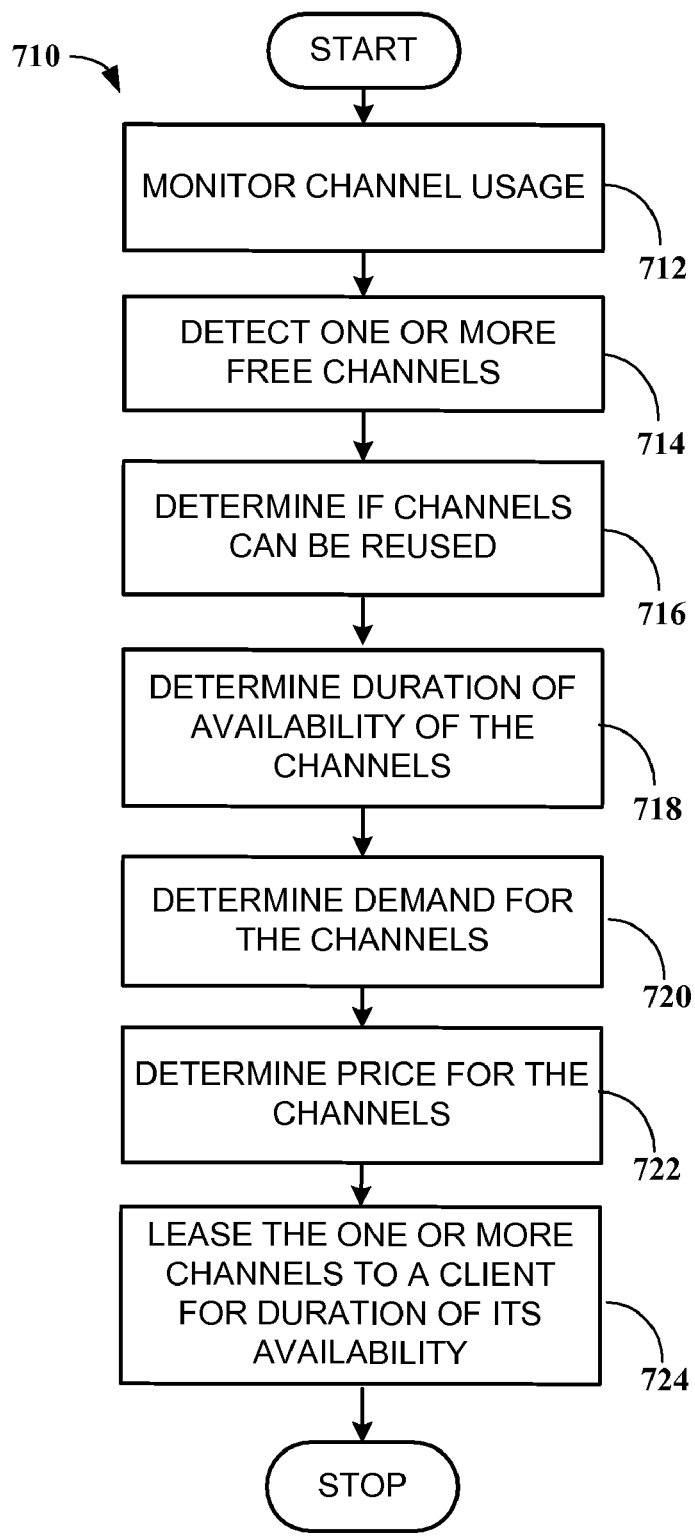
FIG. 7*b* illustrates a flow diagram of a methodology adapted by the communication system of FIG. 7*a* to optimize the usage of its resources.

FIG. 7b illustrates a methodology 710 of channel reuse employed by a communication system, for example a system illustrated in FIG. 7a by utilizing an adaptive radio system disclosed in FIG. 1. Initially at 712, a bandwidth sensing component 110 is used to monitor channel usage within a cell, for example, cell 1 of the system depicted in FIG. 7a. At 714, one or more channels that are available or would soon be available for providing communications are detected. For example, the channels can support unlicensed users or they may be available for certain duration due to low network traffic or due to a provider licensing more bandwidth than needed to service the network traffic. At 716, it is determined if the one or more available channels can be reused. For example, in the system of FIG. 7a, it is determined if the free channels detected within cell 1 can be reused in any of the neighboring cells such as cells 2 or 3. If the same frequencies are being used in cells that are adjacent to cell 2 or cell 3 (e.g. cell 5), then it is concluded that the available channels may not be used in these cells since it would cause co-channel interference within the network. At 718, duration of availability of these channels is determined by the bandwidth sensing component. Within the cellular network example described supra, the duration of availability can be determined by estimating the time until a new call arrives within the cell or arrival of a call handed off from a neighboring cell. At 720, the demand for the available channels is estimated based on various factors such as network traffic within the cell or type of data transmitted. For example, transmission of video content would require greater bandwidth resulting in higher frequency demand. Accordingly, price for renting/leasing the one or more free channels is determined by a bandwidth allocation component 112 based at least on the demand at 722. As detailed supra, price of available channels will vary depending on traffic demands, specific channels, type of data transmitted etc. Based on the demand the one or more channels are leased/rented to a customer at a determined price as shown at 724. In accordance with another aspect, the demand determined at 720 may lead the provider to renting/leasing a channel rather than reserving it for customer service. The client who rents the channel could be another wireless communications provider who requires extra communication channels to service their own customers. Thus, a communication provider may optimize usage of spectrum in accordance with various aspects described herein.

Figure 8:
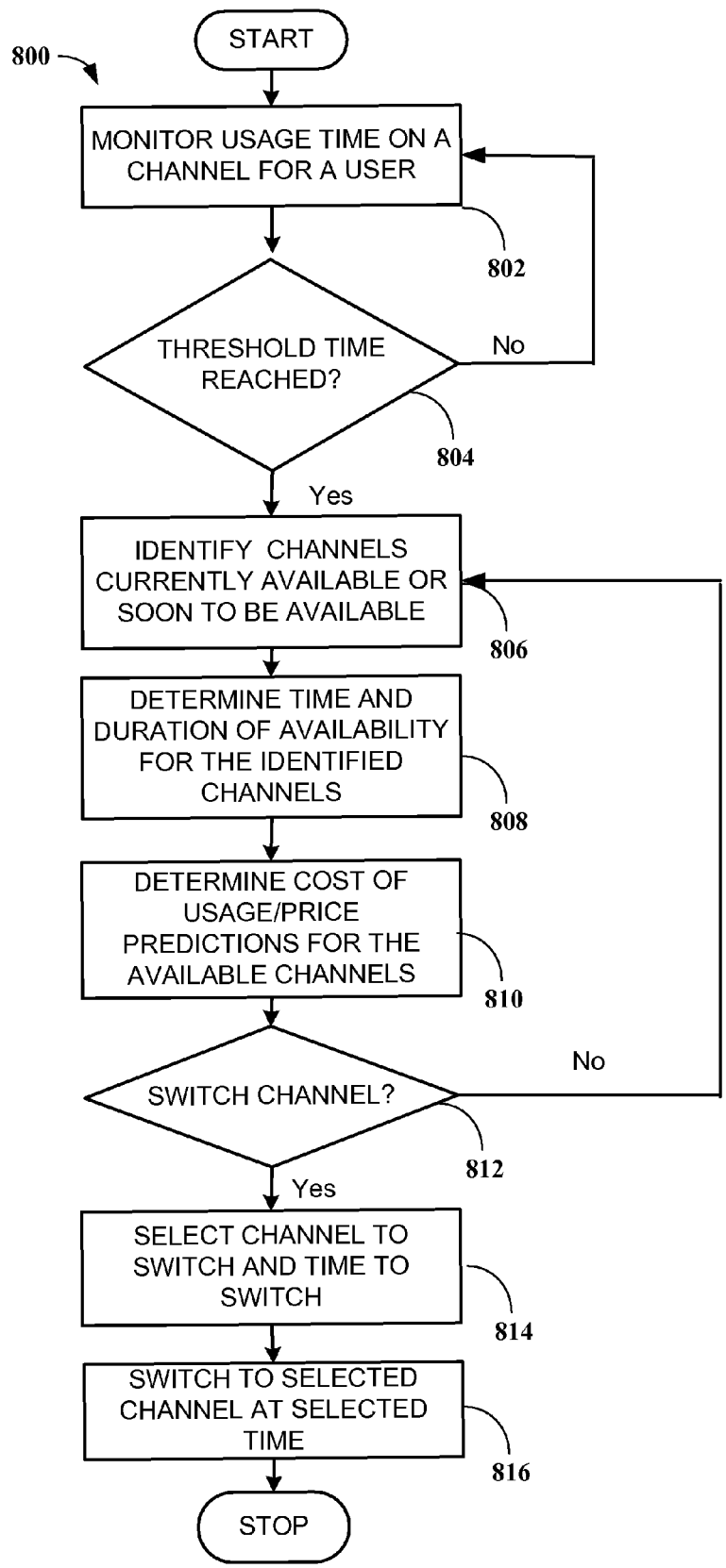
FIG. 8. illustrates a flow diagram of an embodiment that utilizes the predictions from the bandwidth allocation system to facilitate decisions regarding proactive switch versus an imposed reactive switch.

FIG. 8 refers to another embodiment that utilizes a preference model 306 within the adaptive radio 102 for decision making regarding proactively switching channels in order to avoid inconveniences arising from a reactive switch. These decisions to proactively switch channels can be implemented at client side or by a central allocation authority which encourages/enforces such channel usage or a combination thereof. For example, cognitive radio allows unlicensed/secondary users to utilize licensed bands whenever such usage does not interfere with usage of such bands by a licensed user. Upon sensing the presence of a licensed/primary user, the secondary user can switch channels to continue communications. However, such switches are subject to time and availability constraints of appropriate channels. The methodology described in FIG. 8 can be adopted to mitigate the influence of such constraints.

Initially, at 802 time of usage of a channel by a user is monitored by a bandwidth sensing component 110 continuously or at predetermined intervals. The user can be a secondary/unlicensed user utilizing a licensed band for communication. The communication system can utilize the bandwidth predictions generated by the adaptive radio system described supra to define a threshold time of usage left until a channel switch is imposed on the user. The threshold time can be predetermined or set dynamically by techniques discussed in detail earlier, for example, by employing implicitly or explicitly trained classifiers. For example, in mobile communication systems such as cellular telephones, the threshold can be dynamically set based not only on channel availability or cost but also on the geographic location of the mobile user. The classifier(s) determine the threshold time based on different factors such as channel demand or cost associated with channel usage. Accordingly, channels in high demand or expensive channels would be associated with low thresholds. At 804, a determination is made if time of usage of the channel has reached the threshold. If the threshold time is reached, it can be inferred that there is a high probability of a channel switch being imposed. In this situation, at 806 the bandwidth sensing component 110 can be utilized to identify currently available channels or channels that would be soon be available. Upon identifying available channels, the time of their availability and duration of availability is determined for the identified channels at 808. At 810, cost of usage is determined for currently available channels or bandwidth price predictions are generated for channels that would soon be available. At 812 a decision is made on whether to make a switch or to stay with the current channel based on the various factors such as the cost associated with the switch. Decision theoretic optimization can be employed in making the decision to switch in order to minimize the cost of associated with the switch while maximizing the expected utility associated with the switch. A decision to stay with the current communication channel can be made if the expected utility associated with the switch does not justify the cost of switching. Accordingly, the system may return to analyzing the spectrum to identify if other channels have become available. On the other hand, a decision to switch channels can be made if, for example, the benefits associated with the switch offset the cost of switching. The decision regarding switching to the selected channel can also be a weighted result obtained by assigning different weights to each of the aforementioned factors. If the decision is made to switch channels, a channel to switch to and the time to make the switch are selected at 814. The selection can be based on factors such as the duration of availability, time of availability or the associated costs. In accordance with different embodiments, the system switches to the selected channel immediately upon selection before expiration of the threshold time, after a pre-selected interval but before expiration of the threshold time, it may switch at the end of the threshold time upon imposition of a switch by the authority controlling the spectrum based on the factors described above. Finally, at 816 the communication system switches to the selected channel. The methodology described herein when adopted in any of the aforementioned embodiments, mitigates inconveniences associated with reactive switching by proactively selecting/switching channels in advance of an imposed reactive switch.

We note that the methods may be used by individual actors in a distributed manner, by coalitions that share coordinative signals and work as teams, and by a central spectrum allocation coordination system or allocator. There is uncertainty as to how the adaptive radio ecosystem will evolve, but the use of machine learning for proactive optimizations of spectrum usage is valuable in all of these scenarios.

Figure 9:
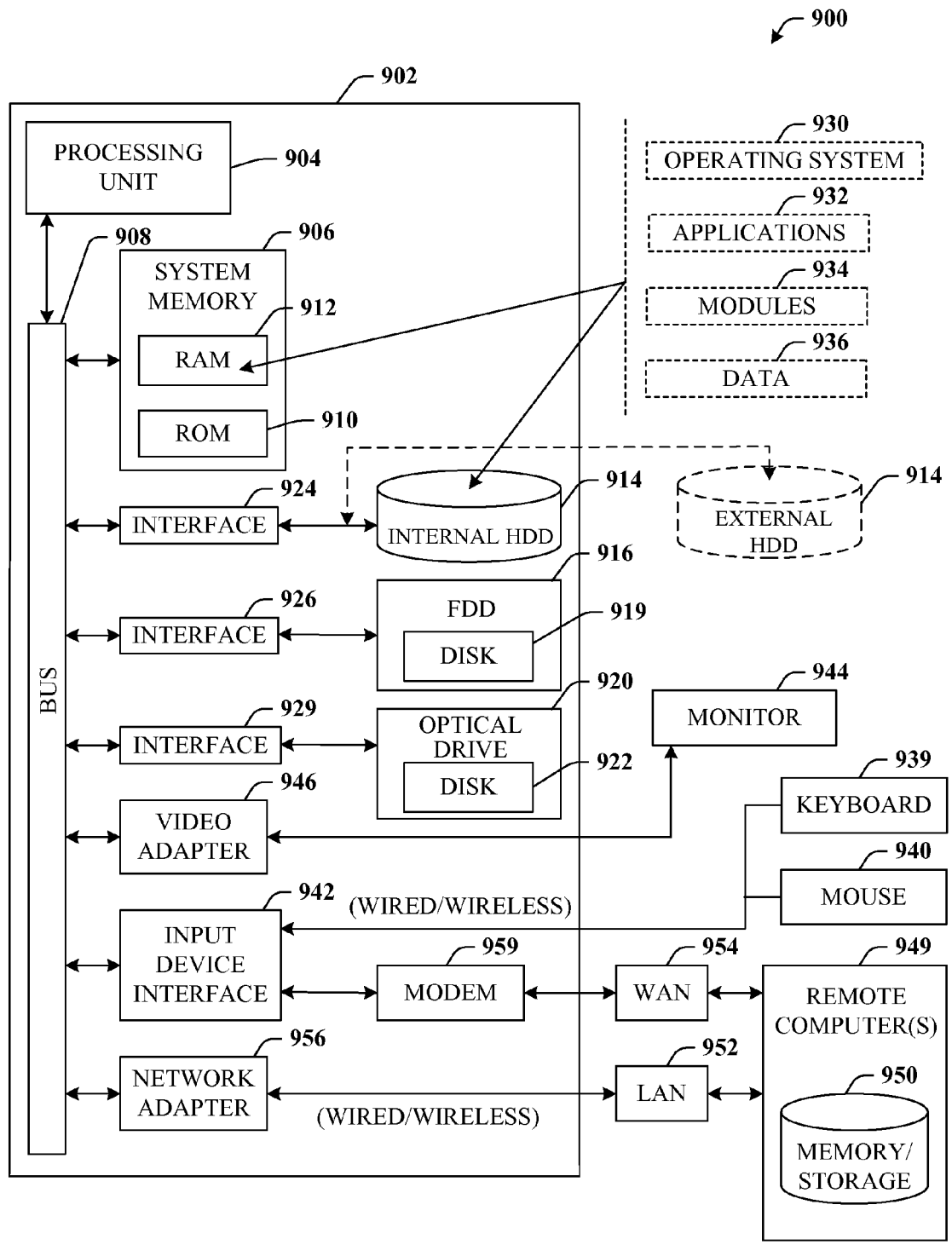
FIG. 9 is a computer operable to execute the disclosed architecture for an adaptive radio system.

Referring now to FIG. 9, there is illustrated a block diagram of an exemplary computer system operable to execute the disclosed architecture. In order to provide additional context for various aspects of the subject invention, FIG. 9 and the following discussion are intended to provide a brief, general description of a suitable computing environment 900 in which the various aspects of the invention can be implemented. Additionally, while the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the invention includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 1104.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 919) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 929, respectively. The interface 924 for external drive implementations includes at least one or both of Universal Serial Bus (USB) and IEEE-134 interface technologies. Other external drive connection technologies are within contemplation of the subject invention.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 939 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, a serial port, an IEEE-134 port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 949. The remote computer(s) 949 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 959, or is connected to a communications server on the WAN 954, or has other means for establishing communications over the WAN 954, such as by way of the Internet. The modem 959, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE-902.11 (a, b, g, etc.) to provide secure, reliable, fast wireless connectivity. A Wi-Fi network can be used to connect computers to each other, to the Internet, and to wired networks (which use IEEE-902.3 or Ethernet). Wi-Fi networks operate in the unlicensed 2.4 and 5 GHz radio bands, at an 11 Mbps (902.11a) or 54 Mbps (902.11b) data rate, for example, or with products that contain both bands (dual band), so the networks can provide real-world performance similar to the basic 10BaseT wired Ethernet networks used in many offices.

Figure 10:
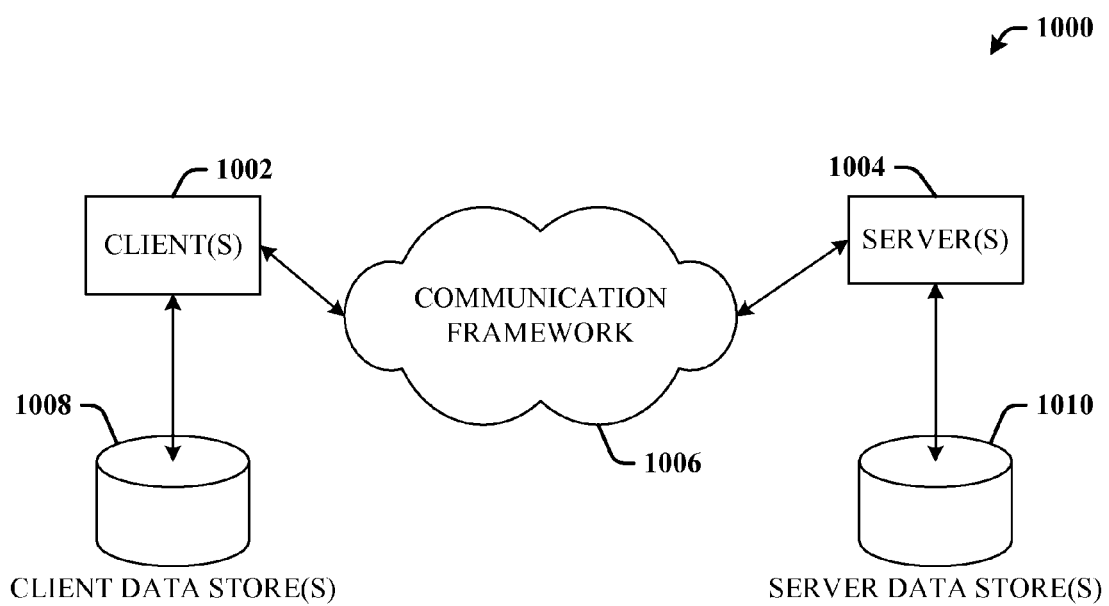
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that optimizes usage of resources in a communication network comprising:
a bandwidth sensing component that:
learns from monitoring communication channels over time and identifies one or more communication channels of unidentified availability to use in an opportunistic manner based at least upon a prediction of duration of availability of the bandwidth; and
infers future availability of the one or more identified channels of unidentified availability, a duration of future availability of the one or more identified channels of unidentified availability, or both, by utilizing statistical machine learning and a set of stored event data comprising mean inter-availability intervals or bursts of usage from the monitoring of the communication channels over time; and
a bandwidth allocation component that adaptively determines time allocations and price predictions for the one or more identified communication channels of unidentified availability, and allocates the one or more identified channels of unidentified availability based on frequency demands, the bandwidth allocation component comprising:
a preference model that:
guides decisions regarding proactive switching of channels versus an imposed reactive switch;
maximizes duration of usage of a first channel by monitoring time of first channel usage and switching to a second channel pre-selected from the one or more communication channels of unidentified availability based on a decision-theoretic employing probability distribution based on likelihoods, costs, and benefits of different switching times; and proactively switches channels prior to an imposed reactive switch upon rising probability of being forced into the reactive switch.

2. The system of claim 1, the bandwidth sensing component predicts the duration of availability in a cellular telephone network, by estimating time until at least one of an arrival of a new call or a call handed off from another cell which would occupy the one or more identified channels of unidentified availability.

3. The system of claim 1, the bandwidth sensing component further comprises a statistical classifier in order to sense the availability and duration of the one or more identified channels of unidentified availability.

4. The system of claim 3, the classifier is explicitly trained based at least on historical data wherein the availability and duration of availability of the one or more identified channels of unidentified availability are considered.

5. The system of claim 3, the classifier is implicitly trained based at least on current inferences regarding the availability and duration of availability of the one or more identified channels of unidentified availability.

6. The system of claim 1, the bandwidth allocation component employs at least frequency demand to facilitate determination of the allocations.

7. The system of claim 1, the bandwidth allocation component further predicts the prices based on a geographic location that generates the frequency demand.

8. The system of claim 1, the bandwidth allocation component further comprises a classifier to at least one of allocate the one or more identified channels of unidentified availability or generate the price predictions.

9. The system of claim 8, the classifier is explicitly trained based at least on historical data wherein the allocations and the price predictions of the one or more identified channels of unidentified availability were correctly inferred.

10. The system of claim 8, the classifier is implicitly trained based at least on current inferences regarding the allocations and the price predictions of the one or more identified channels of unidentified availability.

11. The system of claim 1, the bandwidth allocation component allocates the one or more identified channels of unidentified availability in a cellular communication network based at least upon co-channel interference.

12. The system of claim 1, wherein the statistical machine learning comprises neural networks, expert systems, Bayesian belief networks, support vector machines (SVMs), Hidden Markov Models (HMMs), fuzzy logic, and/or data fusion.

13. The system of claim 1, wherein the bandwidth sensing component further builds one or more predictive models to yield one or more statistical classifiers to infer the future availability of the one or more identified channels of unidentified availability, the duration of future availability of the one or more free channels of unidentified availability, or both.

14. One or more computer storage media not consisting of a signal per se, storing computer-executable instructions for optimizing usage of communication network resources, the instructions, when executed, configure a processor to perform acts comprising:

monitoring frequency bands in a network;

storing a set of frequency band event data comprising mean inter-availability intervals or bursts of usage from the monitoring of the frequency bands;

building, using the set of frequency band event data and statistical machine learning, predictive models to predict duration of future availability of the one or more channels;

identifying one or more of the one or more predicted channels that is likely to be free in the future based at least upon detected bandwidth usage and the predictive models;

adaptively determining allocations for the one or more channels that are likely to be free in the future;

adaptively determining price predictions for the one or more channels that are likely to be free in the future; and maximizing duration of usage for the one or more channels that are likely to be free in the future based on a decision-theoretic employing probability distribution based on likelihoods, costs, and benefits of different switching times.

15. The one or more computer storage media not consisting of a signal per se of claim 14, wherein the identifying identifies the one or more channels that are likely to be free in the future by employing automated decision making harnessing statistical models of channel availability.

16. A system that predicts channel availability across radio frequency channels allocated to respective service providers by comprising:

a bandwidth sensing component that:

monitors a plurality of radio frequency channels allocated to respective service providers;

stores radio frequency channel event data comprising mean inter-availability intervals or bursts of usage from the monitoring of the plurality of radio frequency channels allocated to respective service providers;

builds, using the stored radio frequency channel event data and statistical machine learning, predictive models to predict a point in time, and a duration of time, when each of the plurality of radio frequency channels allocated to respective service providers is likely to be available in the future;

identifies one or more of the plurality of radio frequency channels allocated to respective service providers to be used in the future by any of the respective service providers based at least upon the predictive models; and a bandwidth allocation component that:

determines one or more of the identified one or more radio frequency channels allocated to respective service providers to be used by other service providers based at least upon the predicted points in time, durations of time, and price prediction based on a decision-theoretic employing probability distribution based on likelihoods, costs, and benefits of different switching times of the identified one or more radio frequency channels; and allocates the determined one or more radio frequency channels to be used by the other service providers based on frequency demands of the plurality of radio frequency channels allocated to respective service providers.

* * * * *